(12) United States Patent
Bhagavatula

(10) Patent No.: US 8,997,052 B2
(45) Date of Patent: Mar. 31, 2015

(54) RISK-BASED TEST PLAN CONSTRUCTION

(71) Applicant: Ramana Bhagavatula, Palo Alto, CA (US)

(72) Inventor: Ramana Bhagavatula, Palo Alto, CA (US)

(73) Assignee: SuccessFactors, Inc., South San Francisco, CA (US)

( * ) Notice: Subject to any disclaimer, the term of this patent is extended or adjusted under 35 U.S.C. 154(b) by 0 days.

(21) Appl. No.: 13/921,946

(22) Filed: Jun. 19, 2013

(65) Prior Publication Data

US 2014/0380277 A1   Dec. 25, 2014

(51) Int. Cl.
G06F 9/44 (2006.01)
G06F 11/36 (2006.01)

(52) U.S. Cl.
CPC ............................... G06F 11/3684 (2013.01)
USPC ............................ 717/124; 717/126; 717/127

(58) Field of Classification Search
None
See application file for complete search history.

(56) References Cited

U.S. PATENT DOCUMENTS

| | | | |
|---|---|---|---|
| 5,754,760 A | 5/1998 | Warfield | |
| 6,668,340 B1 * | 12/2003 | Baker et al. | 717/124 |
| 7,124,401 B2 | 10/2006 | Mueller et al. | |
| 7,197,427 B2 * | 3/2007 | Noonan et al. | 702/179 |
| 7,305,659 B2 | 12/2007 | Mueller et al. | |
| 7,490,319 B2 | 2/2009 | Blackwell et al. | |
| 7,506,312 B1 * | 3/2009 | Girolami-Rose et al. | 717/124 |
| 7,747,987 B1 * | 6/2010 | Akarte et al. | 717/126 |
| 7,895,565 B1 * | 2/2011 | Hudgons et al. | 717/124 |
| 8,042,003 B2 | 10/2011 | Ma et al. | |
| 8,056,060 B2 * | 11/2011 | Bicheno et al. | 717/127 |
| 8,266,592 B2 | 9/2012 | Beto et al. | |
| 8,276,123 B1 | 9/2012 | Deng et al. | |
| 8,286,140 B2 * | 10/2012 | Sadowsky | 717/124 |
| 8,423,967 B2 * | 4/2013 | Holden et al. | 717/126 |
| 8,429,459 B2 * | 4/2013 | Birakoglu et al. | 717/124 |
| 8,434,058 B1 * | 4/2013 | Hudgons et al. | 717/124 |
| 8,495,583 B2 * | 7/2013 | Bassin et al. | 717/127 |
| 8,539,438 B2 * | 9/2013 | Bassin et al. | 717/124 |
| 8,645,921 B2 * | 2/2014 | Bassin et al. | 717/127 |
| 8,793,656 B2 * | 7/2014 | Huang et al. | 717/124 |

(Continued)

FOREIGN PATENT DOCUMENTS

WO    WO-2004068347 A1    8/2004

OTHER PUBLICATIONS

Ashraf et al. "Value based Regression Test Case Prioritization", Oct. 24-26, 2012, WCECS 201, the World Congress on Engineering and Computer Science, pp. 1-5; <http://www.iaeng.org/publication/WCECS2012/WCECS2012_pp156-160.pdf>.*

(Continued)

*Primary Examiner* — Thuy Dao
*Assistant Examiner* — Ben C Wang
(74) *Attorney, Agent, or Firm* — Fountainhead Law Group PC

(57) ABSTRACT

In one embodiment, a method determines a plurality of test cases to test an application and a set of attributes assigned to each test case in the plurality of test cases. The method then calculates a test case risk score for each test case in the plurality of test cases based on the set of attributes associated with each respective test case. The test case risk score quantifies a risk in not executing each respective test case. A subset of the plurality of test cases is selected based on at least a portion of the calculated risk scores. The subset of plurality of test cases is output along with a test plan risk score that quantifies the risk in not executing test cases not included in the plurality of test cases.

20 Claims, 6 Drawing Sheets

(56) References Cited

U.S. PATENT DOCUMENTS

| | | | |
|---|---|---|---|
| 2004/0107415 A1* | 6/2004 | Melamed et al. | 717/124 |
| 2005/0261859 A1 | 11/2005 | Petsinger | |
| 2008/0010539 A1 | 1/2008 | Roth | |
| 2008/0126448 A1 | 5/2008 | Sattler et al. | |
| 2008/0172652 A1 | 7/2008 | Davia et al. | |
| 2010/0095274 A1* | 4/2010 | Sadowsky | 717/124 |
| 2011/0067005 A1* | 3/2011 | Bassin et al. | 717/127 |
| 2011/0088014 A1* | 4/2011 | Becker et al. | 717/124 |
| 2011/0145788 A1 | 6/2011 | Xu et al. | |
| 2012/0030651 A1 | 2/2012 | Kemmler et al. | |
| 2012/0042302 A1* | 2/2012 | Sikandar et al. | 717/126 |
| 2012/0151448 A1* | 6/2012 | Becker et al. | 717/124 |
| 2012/0266023 A1 | 10/2012 | Brown et al. | |
| 2012/0266136 A1* | 10/2012 | Brown et al. | 717/124 |
| 2013/0104105 A1* | 4/2013 | Brown et al. | 717/124 |
| 2013/0104106 A1* | 4/2013 | Brown et al. | 717/124 |
| 2014/0325480 A1* | 10/2014 | Bhagavatula | 717/124 |

OTHER PUBLICATIONS

Kasurinen et al., "Test Case Selection and Prioritization: Risk-Based or Design-Based?", 2010 ACM, ESEM'10, Sep. 2010, Bolzano-Bozen, Italy, pp. 1-10; <http://dl.acm.org/results.cfm?h=1&cfid=592669242&cftoken=41007869>.*

Sahoo et al., "Optimized Software Test Management Using Risk Based Approach", International Journal of Software Engineering and Its Applications, vol. 7, No. 3, May 2013, pp. 179-194; <www.sersc.org/journals/IJSEIA/vol7_no3_2013/17.pdf>.*

Erik van Veenendaal, "Practical Risk-Based Testing—Product Risk Management—The PRJSMA Method", EuroStar 2011, Manchester, UK, Nov. 2011, pp. 1-22; <http://improveqs.nl/files/2011-Ebook_Prisma.pdf>.*

Hettiarachchi et al., "Effective Regression Testing Using Requirements and Risks", Jun. 2014 IEEE, pp. 157-166; <http://ieeexplore.ieee.org/stamp/stamp.jsp?tp=&arnumber=6895426>.*

Hans Schaefer, "Risk Based Tersting." Internet article retrieved from http://www.cs.tut.fi/tapahtumat/testaus04/schaefer.pdf. 2004.

Chen Yanping, "A Risk-based Regression Test Selection Strategy," the ISSRE 2003, Nov. 2003.

W.S.A. El-Hamid, SS. El-Etriby, M.M. Hadhoud, "Regression Test Selection Technique for Multi-Programming Language," World Academy of Science, Engineering and Technology 62 2010.

* cited by examiner

1. If (F_AG="new")   300

2. {set TC_RISK =100%}

3. Elsif (TC_TO!="riskbased")
4. {set TC_RISK=100%}

5. Else    302
{    310
6. Set TC_RISK=roundToMulitiple(normalized((normalized((WT_TC_TD*TC_TD))+
       304                              306
normalized(WT_TC_TD*TC_ROF)+normalized(WT_TC_UP*TC_UP)+
       308
normalized(WT_F_FP*F_FP)))

| Feature 402 | TestCase 404 | Tc_et 406 | tc_risk 408 |
|---|---|---|---|
| F1 | T1 | 30mins | 100% |
| F1 | T2 | 45mins | 100% |
| F2 | T3 | 30mins | 95% |
| F2 | T4 | 20mins | 50% |
| F2 | T5 | 20mins | 40% |
| ... | | | |
| Fn | Tn | Nmins | N% |

| Tc_Risk 412 | TotalTime 414 | Cumulative 416 |
|---|---|---|
| 100% | 75hours | 75hours — 418 |
| 95% | 30hours | 105hours — 420 |
| . | | |
| . | | |
| . | | |
| 20% | 50hours | 700hours |
| 15% | 60hours | 760hours |
| ... | | |

422 brackets the Tc_Risk column; 424 brackets the full right side.

| Feature 428 | TestCase 430 |
|---|---|
| F1 | T1 |
| F1 | T2 |
| F2 | T3 |
| F2 | T4 |
| F2 | T5 |
| ... | |
| Fx | Tx |

FIG. 4C

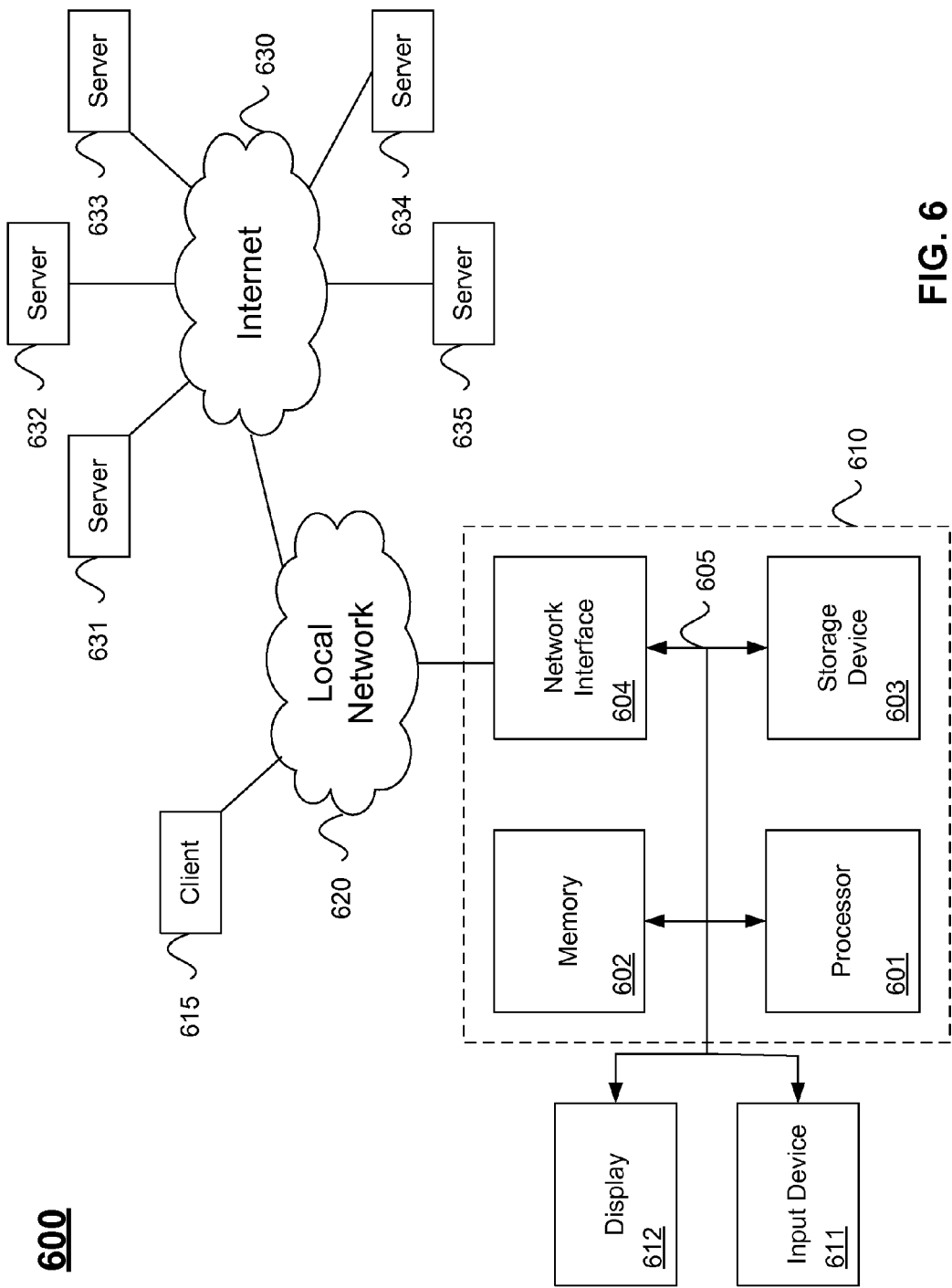

RISK-BASED TEST PLAN CONSTRUCTION

BACKGROUND

Before releasing a software application, companies often test the application using various test cases. Releasing a good quality application is important for keeping customers happy, garnering renewals of contracts for the application, and staying ahead of any competition. However, with more and more features being added to different versions of software applications, testing of the whole application with acceptable quality when using limited resources becomes harder for a company. Because every feature of an application cannot be tested due to the limited resources, it is important for a quality assurance (QA) organization to create a test plan that selects the right test cases to test the application. That is, the goal of the test plan is to select test cases that test the application with the optimal quality control that is possible with the limited resources. However, different QA organizations as well as different QA teams within the same organization often have different approaches for selecting the right test cases. Thus, the testing of the software application becomes subjective based on who is creating the test plan.

SUMMARY

In one embodiment, a method determines a plurality of test cases to test an application and a set of attributes assigned to each test case in the plurality of test cases. The method then calculates a test case risk score for each test case in the plurality of test cases based on the set of attributes associated with each respective test case. The test case risk score quantifies a risk in not executing each respective test case. A subset of the plurality of test cases is selected based on at least a portion of the calculated risk scores. The subset of plurality of test cases is output along with a test plan risk score that quantifies the risk in not executing test cases not included in the plurality of test cases.

In one embodiment, a non-transitory computer-readable storage medium contains instructions, that when executed, control a computer system to be configured for: determining a plurality of test cases to test an application; determining a set of attributes assigned to each test case in the plurality of test cases; calculating a test case risk score for each test case in the plurality of test cases based on the set of attributes associated with each respective test case, wherein the test case risk score quantifies a risk in not executing each respective test case; selecting a subset of the plurality of test cases based on at least a portion of the calculated risk scores; and outputting the subset of plurality of test cases along with a test plan risk score that quantifies the risk in not executing test cases not included in the plurality of test cases.

In one embodiment, an apparatus includes: one or more computer processors; and a non-transitory computer-readable storage medium comprising instructions, that when executed, control the one or more computer processors to be configured for: determining a plurality of test cases to test an application; determining a set of attributes assigned to each test case in the plurality of test cases; calculating a test case risk score for each test case in the plurality of test cases based on the set of attributes associated with each respective test case, wherein the test case risk score quantifies a risk in not executing each respective test case; selecting a subset of the plurality of test cases based on at least a portion of the calculated risk scores; and outputting the subset of plurality of test cases along with a test plan risk score that quantifies the risk in not executing test cases not included in the plurality of test cases.

The following detailed description and accompanying drawings provide a better understanding of the nature and advantages of particular embodiments.

BRIEF DESCRIPTION OF THE DRAWINGS

FIG. 3 depicts a process that test plan risk manager uses to calculate the risk score according to one embodiment.

FIG. 4A depicts an example of an organization according to one embodiment.

FIG. 4B shows a chart that includes the cumulative time according to one embodiment.

FIG. 4C shows an example of a test plan according to one embodiment.

FIG. 6 illustrates hardware of a special purpose computing machine configured with the test risk plan manager according to one embodiment.

DETAILED DESCRIPTION

Described herein are techniques for a risk-based testing system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Figure 1:
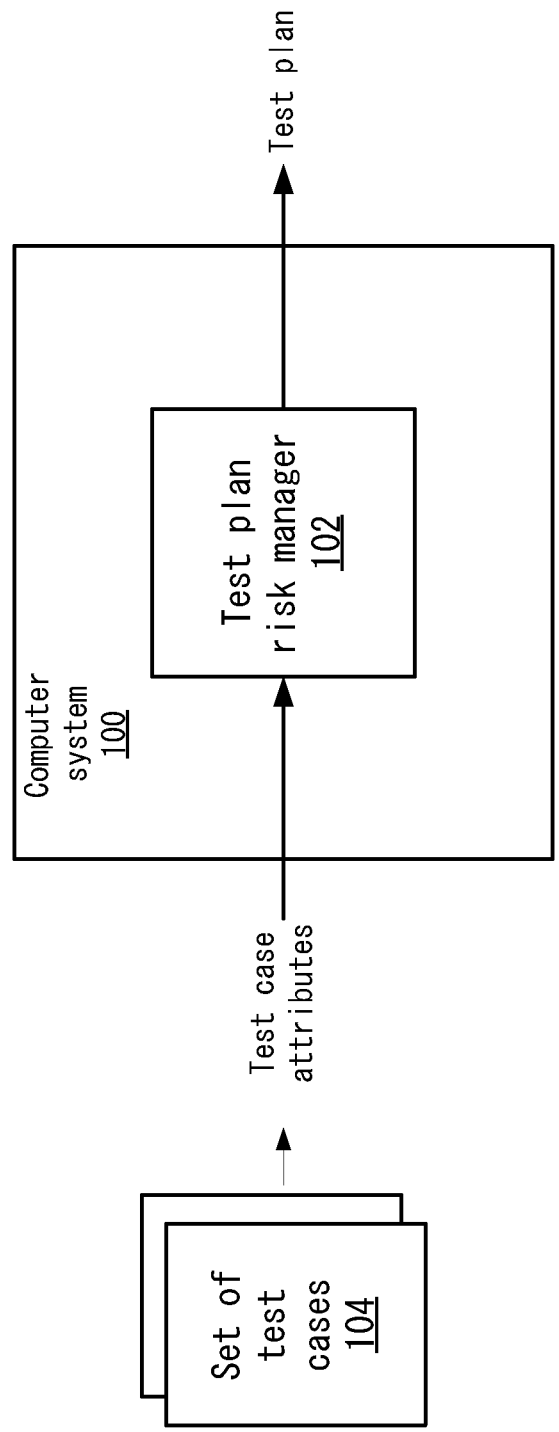
FIG. 1 depicts a simplified system for determining a test plan according to one embodiment.

FIG. 1 depicts a simplified system 100 for determining a test plan according to one embodiment. A computer system 100 receives test case attributes that describe characteristics for a set of test cases 104. The set of test cases 104 are used to test a software application. Test case attributes may be configured for each test case 104. For example, a user may manually configure the test case attributes. In other examples, particular embodiments may automatically generate test case attributes based on characteristics of each test case 104. The test case attributes will be described in more detail below.

A test plan risk manager 102 receives the test case attributes and calculates a test plan. In a process described in more detail below, test plan risk manager 102 determines less than 100% of the set of test cases 104 to execute in the test plan. This is referred to as a risk-based testing approach because not all the test cases are used to test the software application, which causes some risk that a failure may not be detected in the software application. Not detecting a failure also results in a risk to the quality of the software application. For example, one of the test cases not used might have tested and detected a failure for a feature in the software application that later failed after the software application was released. Thus, in risk-based testing, some risk to the performance of the software application is acceptable to a company when selecting less than 100% of test cases 104.

In selecting test cases 104 to include in the test plan, test plan risk manager 102 evaluates and quantifies the risk to the quality of the software application. Test plan risk manager 102 may quantify the risk to the quality in a risk score in addition to identifying which test cases 104 are selected for the test plan. For example, the test plan may indicate that there is a 20% risk if these test cases 104 are executed. The 20% risk may mean that there is a 20% risk that a failure may not be detected. In this case, a 100% risk means that there is 100% risk to quality of the software application. A 1% risk means that there is very little risk to quality of the software application. Any scoring system that quantifies risk may be used. For example, although a percentage is used, a scale from 1 to 100 may also be used.

Figure 2:
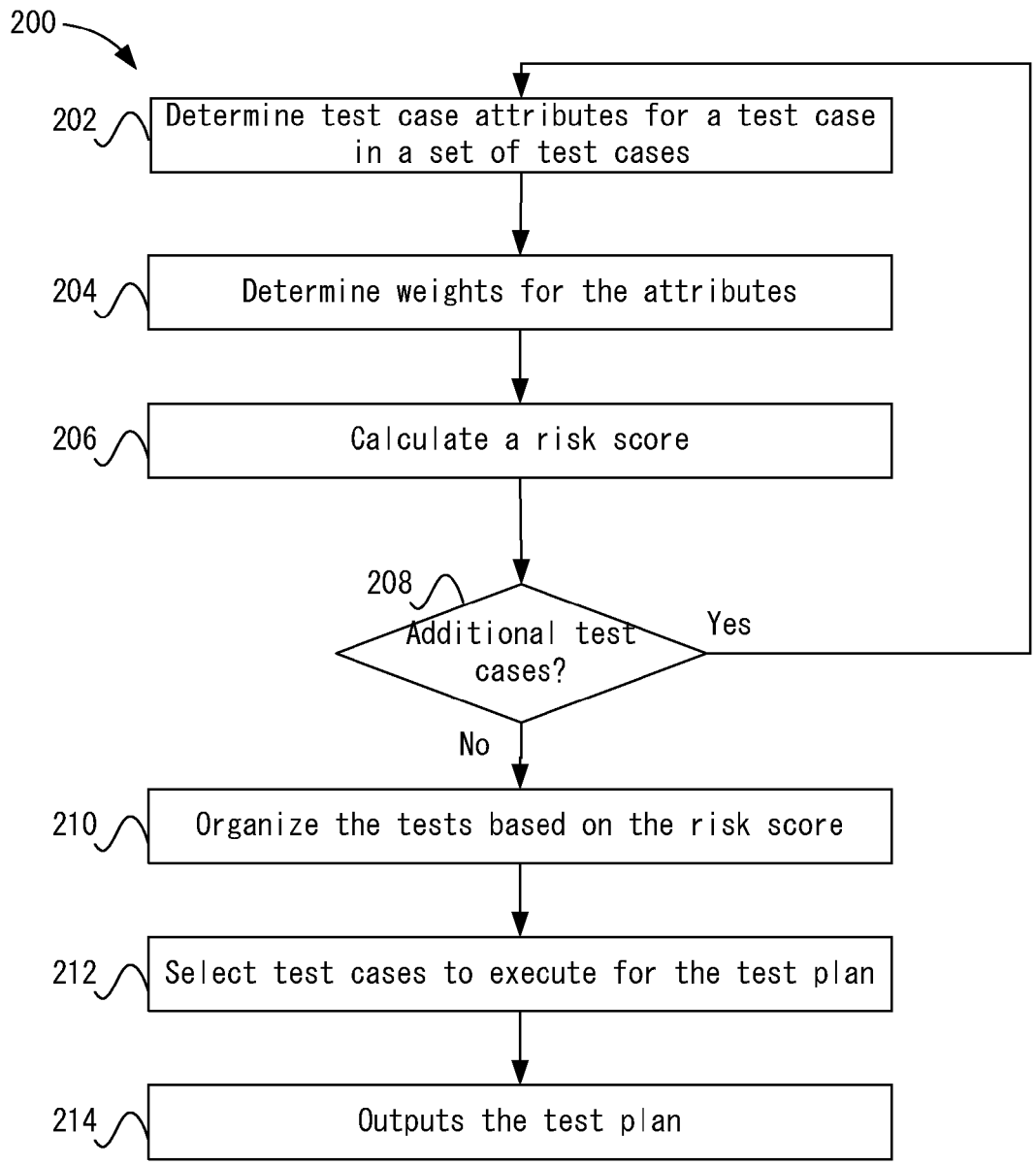
FIG. 2 depicts a simplified flowchart of a method for outputting a test plan according to one embodiment.

FIG. 2 depicts a simplified flowchart 200 of a method for outputting a test plan according to one embodiment. Test plan risk manager 102 may execute with some or all of the following assumptions. In one embodiment, test cases 104 are organized by feature. A feature is an aspect of the software application that is being tested by the test case. For example, feature F1 is tested by test cases T1, T2, $T_n$, a Feature F2 is tested by test cases T4, T5, and $T_x$, etc. A test case 104 may include a use case for a feature. The feature is the aspect of the software application that is being tested and the feature may be tested using multiple use cases, which may be different ways the feature is being used in the software application. For example, one test case may test the send function of the e-mail feature and another test case may test the receive function of the e-mail feature.

Also, another assumption is that the test cases are atomic and normalized. That is, there are redundancies of features being tested by multiple test cases. Also, there are no subsets of test cases. A subset of a test case is where one subset of a test case tests a first feature and another subset of a test case tests another feature. One reason why test cases are atomic and normalized is that test cases that overlap in testing make evaluating risk harder.

In one embodiment, the execution time needed for each test case is associated with the test case. The execution time is the amount of time needed to run the test case. This may include the automatic execution of the test case and/or any manual acts that are needed to run the test case. The execution time quantifies the amount of resources needed either by a total time to run the test case and/or by an amount of actual manual time that a user needs to dedicate to executing the test case.

In one embodiment, the quality assurance organization of a company has knowledge or can obtain information regarding the usage or popularity of the features and use cases by the customers. For example, the knowledge may be obtained based on customer surveys. Additionally, the quality assurance organization may also estimate or interpolate the usage or popularity of the features/use cases.

At 202, test risk plan manager 102 determines test case attributes for a test case in a set of test cases 104. Each test case 104 includes test case attributes, which may be manually input by a user for each test case 104. In another embodiment, test plan risk manager 102 may analyze characteristics of test cases 104 to automatically determine respective test case attributes.

In one embodiment, test case attributes may include test case-related attributes and feature-related attributes. Test case-related attributes relate to the specific test case. Feature-related attributes relate to the feature that is being tested by one or more test cases.

In one embodiment, five test case-related attributes are provided. Although these test case-related attributes are described, other attributes may also be used. The five test case attributes include a test case dependency (TC_TD) attribute, a risk-of-failure (TC_ROF) attribute, a use case popularity (TC_UP) attribute, a test case override (TC_TO) attribute, and a test case execution time (TC_ET) attribute.

The test case dependency attribute quantifies how many test cases depend upon the success of a current test case. For example, the current test case needs to pass definitely for some dependent test cases to pass. Thus, if the current test case fails, then the dependent test cases also fail. In one embodiment, the test cast dependency attribute may be a number, such as three test cases depend upon this current test case. The test case attribute may be manually input or may be automatically generated. For example, in the automatic generation, the test cases may be stored in a database and associated with other test cases based on dependencies via database tables. A database query may query which test cases are associated with this test case in the database to determine the test case dependency attribute. The test case dependency attribute may be important because failure of the current test case may mean that a certain number of other test cases are blocked.

The risk-of-failure attribute quantifies the risk that the failure of the current test case will affect the functionality of the software application (e.g., the feature or the product). That is, if this test case fails, the risk of failure quantifies the consequence to users using the software application. For example, the consequences may include complete loss of usage of the software application, data loss, a minor inconvenience but the software application may still be functional, a functional loss but a user can still work around the loss, etc. The risk-of-failure attribute may be a direct indication of the true importance of the test case to the software application and the users using the software application. In one embodiment, the risk of failure may be rated on a scale, such as 1-5 or 1-100. In one example, a higher number may indicate a higher consequence if the failure of the feature being tested results.

The use case popularity attribute is a score to indicate how popular the use case being addressed by the current test case is. For example, a test case addressing a use that most likely will not be used by the user or may be rarely used by the user may receive a lower use case popularity score. The use case popularity attribute may be a score in any scale, such as from 1-100.

The test case override attribute indicates which test cases may not be subjected to risk-based testing. That is, some test cases may need to always be executed in some circumstances. The test case override attribute may be set to values that indicate whether or not the test case should be overridden. The values may include "always", which means the test case always needs to be executed; "risk-based", which means the test case is subject to risk-based testing; "milestone" which means the test case only needs to be executed for a certain milestone (e.g., a certain release or a certain stage in the development of the software application); "security", which means the test case is testing the security of the application. Other test case override attributes may also be used. In one example, regression tests that seek to uncover new software bugs may be subject to the risk-based testing, and in one embodiment, test plan risk manager 102 only operates on risk-based test cases. On the other hand, test cases rated as "security" and "always" may not be subjected to the risk-based testing. That is, these test cases are always executed (e.g., a company may always want to ensure that the security of the application is thoroughly tested.).

The test case execution time attribute quantifies the resources needed to execute the test case, such as how much time is typically needed to execute the test case. For example, the execution time may be how long a test case takes to run and/or how long a manual tester needs to devote to testing to execute the test case. In one example, a manual tester may need to start the test case and then perform some actions during the test case or when the test case ends. The test case execution time attribute may quantify the time between the start and end of the execution of the test case, just the time taken by the manual tester, or some combination thereof.

In one embodiment, two feature-related attributes are used. For example, a feature popularity (F_FP) attribute and an age-of-the-feature (F_AG) attribute are used; however, other feature-related attributes may be used.

The feature popularity attribute quantifies the percentage or number of customers using the feature. If the feature is not new, input from a user may be received for the approximate popularity. For example, a user may input a number in a scale from 1-5 for the popularity. If a feature is estimated to be highly popular with customers, the feature popularity attribute may receive a score of 5. This attribute is applicable to the feature and may be inherited for all test cases associated with the feature. If the feature is new, then the popularity may be estimated based on other related features. For example, a user may estimate the popularity of the feature based on how popular other related features are rated. Additionally, test risk plan manager 102 may automatically estimate the popularity by analyzing use metrics of the feature, or by any other method.

The age-of-the-feature attribute may estimate how long the feature has been used. For example, the age of the feature may be characterized as "new", which means a new feature not existing in a prior release of the software application, or "existing", which means the feature existed in a prior release.

Once determining the attributes for the test case, at 204, test plan risk manager 102 may determine weights for the attributes. The weights value the importance of each risk attribute. A higher weight to a risk attribute may mean that the attribute is more important for the test case than other attributes. Test plan risk manager 102 may use weights for the test case dependency attribute, risk-of-failure attribute, use case popularity attribute, and feature popularity attribute. Weights for the test case override and test case execution time may not be applicable because these attributes are not scored on a scale. That is, the test case override may indicate whether or not the test case should be used and the execution time does not need to be weighted. The weights may be denoted for the test case attributes as WT_TC_TD, WT_TC_ROF, WT_TC_UP, and WT_F_FP. In one example, the weights may be assigned as follows: WT_TC_TD=30%; WT_TC_ROF=40%; WC_TC_UP=20%; and WT_F_FP=10%. Input from a user may be received to assign the weights to each attribute. Also, test plan risk manager 102 may analyze the characteristics of the test case to assign the weights. For example, based on how the software application will be used, test plan risk manager 102 may determine the applicable weights. For example, test risk plan manager 102 assigns an attribute with a higher score that is more important to the test case a higher weight.

At 206, test plan risk manager 102 calculates a risk score. The risk score quantifies the risk to the quality of the application if the test case is not executed. In one embodiment, test plan risk manager 102 uses a process described in FIG. 3 to calculate the risk score according to one embodiment. Although this process is described, other processes may be used. In a line 1 of the pseudo code 300, test plan risk manager 102 determines if the age-of-the-feature attribute F_AG is set to the value of "new". This indicates that the feature is new and may not have existed in a prior version of the software application and/or been tested before. In line 2, test plan risk manager 102 sets the risk score TC_RISK to 100%. The value of 100% indicates that this test case has the highest risk to the quality of the software application if it is not executed and thus will most likely be executed. Although 100% is used, other values may be provided. In this case, test plan risk manager 102 may want to test any feature that is new and has not been tested before.

In line 3, test plan risk manager 102 tests whether the test case override attribute is not set to "risk-based". Line 3 is testing whether the test case may be subject to risk-based testing. In line 4, test plan risk manager 102 may set the risk score TC_RISK to 100%. In this case, if the test case is not going to be subject to risk-based testing, that is, the test case should always be executed, then test risk plan manager 102 sets the risk to 100% such that the test case is deemed the most important and most likely always executed.

In line 5, in all other cases that do not fall within the conditions in lines 1 and 3, test risk plan manager 102 executes line 6, which sets the risk score TC_RISK to a calculated score based on the values for the test case attributes. For example, in calculating the risk score, test risk plan manager 102 applies the weights for each attribute to the values of each respective attribute. At 302, the weight WT_TC_TD for the test case dependency attribute is applied to the value for the test case dependency attribute TC_TD; at 304, the weight WT_TC_ROF is applied to the risk-of-failure attribute TC_ROF; at 306, the weight WT_TC_UP is applied to the value of the use case popularity attribute TC_UP; and at 308, the weight WT_F_FP is applied to the value of the feature popularity attribute F_FP.

In one embodiment, test case risk manager 102 normalizes each weighted value for the test case attributes. Test plan risk manager 102 performs the normalization because some values for the test case attributes may be rated on different scales. In one embodiment, the normalizing may normalize the values with respect to a value, such as 100. In one example, test risk plan manager 102 normalized test case dependency attribute as 100*(WT_TC_TD/MAX_WT_TD)*(TC_TD/SUM(test cases)), where MAX_WT_TD is the maximum score for the test case dependency attribute and SUM(test cases) is the sum of the scores for all of the attributes. Test risk plan manager 102 may also use other methods to normalize the scores. Further, normalization may not be needed if the scores for the attributes are consistent and do not need to be normalized.

At 310, test plan risk manager 102 may round the normalized result using a rounding function (roundToMultiple) shown at 310. The rounding function rounds results to the nearest multiple of a number, such as in increments of 5, 10, etc. For example, if the roundToMultiple is 5, then a value of 87.5-90 gets converted to 90 and a value of less than 87.5 to 85.1 gets converted to 85. Although the rounding is discussed above, it will be understood that rounding may not be necessary.

Referring back to FIG. 2, at 208, test plan risk manager 102 determines if additional test cases need to be tested. If so, the process reiterates to 202 to determine attributes for another test case. Once all the test cases have been tested, at 210, test plan risk manager 102 organizes the tests based on the risk score. For example, the following pseudo code may be used to organize the tests:

```
For (all testcases)
{
List Feature, testcase, TC_ET, TC_RISK order by Feature (asc),
TC_RISK (desc)
}
```

In the above pseudo code, the features being tested by the test cases may be organized based on a criterion, such as the risk score in an ascending or descending order. FIG. 4A depicts an example of an organization according to one embodiment. A column 402 lists the features being tested. For example, features F1, F2, . . . Fn are being tested by the test cases. In a column 404, identifiers for each test case that are testing the features are included from test cases T1-Tn.

In a column 406, the test case execution time is listed for each test case. This is found in the test case execution time attribute TC_ET for each test case.

In a column 408, the risk score that test plan risk manager 102 calculated is listed. As can be seen, table 400 organizes the test cases based on the risk score determined and test plan risk manager 102 has sorted the test cases based on the risk score from highest to lowest.

Referring back to FIG. 2, at 212, test plan risk manager 102 selects test cases to execute for the test plan. From chart 400, test plan risk manager 102 may calculate a cumulative time needed for each risk score. For example, the following pseudo code describes the process as follows:

```
For (TC_RISK=100 through TC_RISK =0)
{
TC_RISK, SUM(TC_ET), cumulative(sum(TC_ET))
}
```

In the above, from the 100% risk score to the 0% risk score, the cumulative time is calculated for each risk score.

FIG. 4B shows a chart 410 that includes the cumulative time according to one embodiment. In a column 412, each risk score is listed. The risk score here encompasses all test cases for that specific risk score. For example, in FIG. 4A, the 100% risk score was associated with test cases T1 and T2.

In a column 414, the total time for all test cases associated with the specific risk score is listed. In this case, test cases T1 and T2 were associated with a 100% risk and the total time needed to test both test cases T1 and T2 is 75 hours. The total time for each risk score is then summarized in column 414.

In a column 416, the cumulative time for testing a specific risk score and above is listed. For example, at 418, if only the test cases for a 100% risk score are tested, then a cumulative time of 75 hours is needed. At 420, if testing at a 95% risk score is used, then test cases for the 95% risk score and the 100% risk score need to be tested. This results in a cumulative time of 105 hours by adding 75 hours to 30 hours. In this case, test cases T1, T2, and T3 may be used. The cumulative time continues to be added as the risk scores go down. Also, if a risk score of 20% is desired, the cumulative time to execute all test cases for a 20% risk (i.e., all test cases with a risk score of 20% and above) may be 700 hours.

As discussed above, a company may not have unlimited resources to execute all of the test cases. Thus, the company may select a risk score that the company is comfortable with and/or the cumulative time in which resources can be dedicated to testing. In one embodiment, test plan risk manager 102 may select a risk score and/or a cumulative time. For example, a user may have set the appropriate risk score at 20%. In this case, test plan risk manager 102 selects all test cases from the 20% risk score to the 100% risk score as shown at 422. In another example, user input may be received indicating the amount of resources that can be dedicated to testing. For example, if 760 hours can be dedicated to testing, test plan risk manager 102 may select the test cases shown at 424, which take a cumulative time of 760 hours. This results in a 15% risk.

Referring back to FIG. 2, at 214, test plan risk manager 102 outputs the test plan. For example, the test plan only includes the test cases that test plan risk manager 102 selected. FIG. 4C shows an example of a test plan according to one embodiment. Test plan 426 lists the feature in a column 428 and a test case in a column 430. Not all of the test cases are listed in the test plan. For example, test cases T1-Tx are included in test plan 426, where Tx is less than Tn. The following includes pseudo code that may generate the test plan as follows:

```
For (tc_risk=100 through acceptable tc_risk)
{
List Feature, testcase
}
```

In the above, from the 100% risk score to the acceptable risk score TC_risk, test plan risk manager 102 outputs the list feature and the test case.

Using the risk score, a company can determine what risk they are taking by not executing some test cases. For example, when a 20% risk is used, the company may know that there is a risk of 20% that the quality of the software application will be compromised by not executing some of the test cases.

Figure 5:
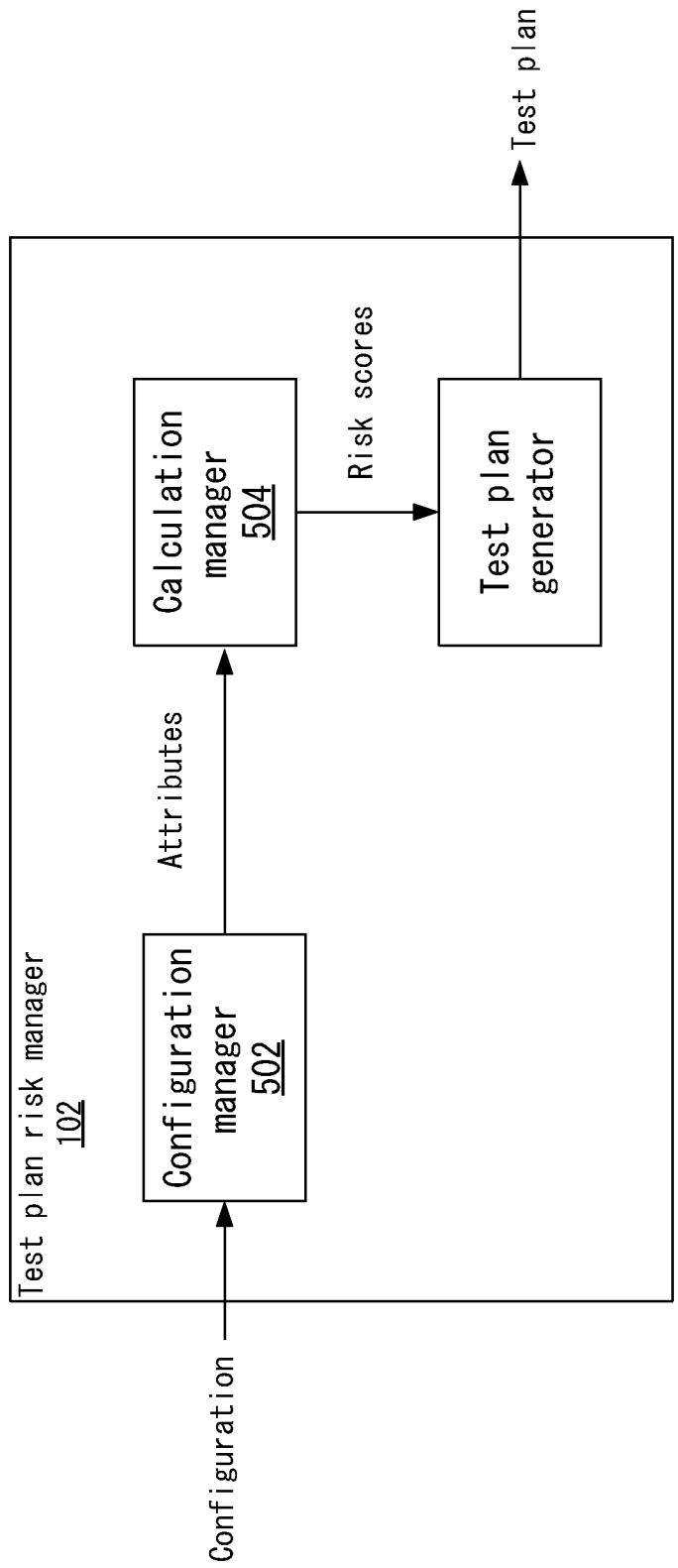
FIG. 5 depicts a more detailed example of a test plan risk manager according to one embodiment.

FIG. 5 depicts a more detailed example of test plan risk manager 102 according to one embodiment. A configuration manager 502 receives information for test plan attributes and/or weights. For example, configuration manager 502 receives input from a user indicating the values for the test plan attributes and weights. In another example, configuration manager 502 may automatically calculate the values for the test plan attributes and weights.

A calculation manager 504 calculates the risk score as described above. For example, calculation manager 504 receives the attributes and weights from configuration manager 502 and calculates the risk score as described above.

A test plan generator 506 receives the risk scores for all of the test cases from calculation manager 504. Test plan generator 506 then generates a test plan based on some criteria. For example, user input indicating the acceptable risk or cumulative time may be received by test plan generator 506 and used to determine which test cases should be part of the test plan.

Accordingly, the risk score takes into account several factors that can be used to quantify the risk to the quality of the software application. The automatic determination of risk and selection of test cases to execute may help companies better evaluate which test cases to execute. This may provide a standardized approach across many different departments of a company that are performing risk-based testing. This may result in better testing and accordingly better software applications.

FIG. 6 illustrates hardware of a special purpose computing machine configured with test risk plan manager 102 according to one embodiment. An example computer system 610 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable storage mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information through the network interface 604 across a local network 620, an Intranet, or the Internet 630. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
    determining, by a computing device, a plurality of test cases to test an application;
    determining, by the computing device, a set of attributes assigned to each test case in the plurality of test cases, wherein the set of attributes are determined without execution of each test case;
    calculating, by the computing device, a test case risk score for each test case in the plurality of test cases based on the set of attributes associated with each respective test case, wherein the test case risk score quantifies a risk in not executing each respective test case;
    selecting, by the computing device, a first subset of the plurality of test cases based on at least a portion of the calculated risk scores; and
    outputting, by the computing device, a test plan including the first subset of the plurality of test cases along with a test plan risk score that quantifies the risk in not executing a second subset of the plurality of test cases not included in the first subset of the plurality of test cases, wherein the test plan does not include the second subset of the plurality of test cases.

2. The method of claim 1, wherein the set of attributes comprise test case related attributes that characterize the test case.

3. The method of claim 2, wherein test case related attributes comprise a test case dependency attribute describing a number of test cases that are dependent on a test case, a risk of failure attribute describing a risk of failure to a functionality of the software application, a use case popularity attribute describing how popular a use case being tested by the test case is, a test case override attribute indicating whether or not the test case should always be included in the subset of the plurality of test cases, and a test case execution time indicating an amount of resources needed to execute the test case.

4. The method of claim 1, wherein the set of attributes comprise feature related attributes that characterize a feature of the application being tested by a respective test case.

5. The method of claim 4, wherein the feature related attributes comprise a feature popularity attribute indicating a popularity of use for a feature being tested by a test case, and an age of the feature indicating an age of the feature being tested by the test case.

6. The method of claim 1, further comprising weighting attributes in the set of attributes with different weights for each respective test case.

7. The method of claim 6, wherein calculating the test case risk score comprises:
    applying each attribute's respective weight to a value for each attribute for a test case to determine an attribute score for each attribute; and
    using each of the attribute scores to determine the test case risk score for the test case.

8. The method of claim 1, wherein each test case is associated with a time estimating resources used to execute the test case.

9. The method of claim 8, wherein selecting the first subset of the plurality of test cases comprises:
    determining a cumulative time for testing the application; and selecting the first subset of the plurality of test cases based on the cumulative time and respective test case risk score associated with the first subset of the plurality of test cases.

10. The method of claim 9, wherein selecting the first subset of the plurality of test cases comprises:
selecting test cases with a highest test case risk score until the cumulative time for testing is reached based on the time associated with each selected test case.

11. The method of claim 1, wherein selecting the first subset of the plurality of test cases comprises:
determining an acceptable test case risk score for testing the application; and
selecting the first subset of the plurality of test cases based on the acceptable test case risk score.

12. The method of claim 1, wherein outputting comprises outputting the lowest test case risk score associated with one of the first subset of the plurality of test cases as the test plan risk score.

13. The method of claim 1, wherein calculating the test case risk score comprises:
determining an age attribute for a test case; and
when the age attribute indicates the test case is new or has not been tested before, assigning a test case risk score such that the test case is included in the first subset of the plurality of test cases.

14. The method of claim 1, wherein calculating the test case risk score comprises:
determining an override attribute for a test case;
when the override attribute is set to a first value, assigning a test case risk score such that the test case is included in the first subset of the plurality of the test cases.

15. A non-transitory computer-readable storage medium containing instructions, that when executed, control a computer system to be configured for:
determining a plurality of test cases to test an application;
determining a set of attributes assigned to each test case in the plurality of test cases, wherein the set of attributes are determined without execution of each test case;
calculating a test case risk score for each test case in the plurality of test cases based on the set of attributes associated with each respective test case, wherein the test case risk score quantifies a risk in not executing each respective test case;
selecting a first subset of the plurality of test cases based on at least a portion of the calculated risk scores; and
outputting a test plan including the first subset of the plurality of test cases along with a test plan risk score that quantifies the risk in not executing a second subset of the plurality of test cases not included in the first subset of the plurality of test cases, wherein the test plan does not include the second subset of the plurality of test cases.

16. The non-transitory computer-readable storage medium of claim 15, wherein the set of attributes comprise feature related attributes that characterize a feature of the application being tested by a respective test case.

17. The non-transitory computer-readable storage medium of claim 15, wherein the set of attributes comprise feature related attributes that characterize a feature of the application being tested by a respective test case.

18. The non-transitory computer-readable storage medium of claim 15, wherein calculating the test case risk score comprises:
determining an age attribute for a test case; and
when the age attribute indicates the test case is new or has not been tested before, assigning a test case risk score such that the test case is included in the first subset of the plurality of test cases.

19. The non-transitory computer-readable storage medium of claim 15, wherein calculating the test case risk score comprises:
determining an override attribute for a test case;
when the override attribute is set to a first value, assigning a test case risk score such that the test case is included in the first subset of the plurality of test cases.

20. An apparatus comprising:
one or more computer processors; and
a non-transitory computer-readable storage medium comprising instructions, that when executed, control the one or more computer processors to be configured for:
determining a plurality of test cases to test an application;
determining a set of attributes assigned to each test case in the plurality of test cases, wherein the set of attributes are determined without execution of each test case;
calculating a test case risk score for each test case in the plurality of test cases based on the set of attributes associated with each respective test case, wherein the test case risk score quantifies a risk in not executing each respective test case;
selecting a first subset of the plurality of test cases based on at least a portion of the calculated risk scores; and
outputting a test plan including the first subset of the plurality of test cases along with a test plan risk score that quantifies the risk in not executing a second subset of the plurality of test cases not included in the first subset of the plurality of test cases, wherein the test plan does not include the second subset of the plurality of test cases.

* * * * *